(12) United States Patent
Galden (10) Patent No.: US 12,553,581 B1
(45) Date of Patent: Feb. 17, 2026

(54) PORTABLE POWER STATION

(71) Applicant: Honda Motor Co., Ltd., Tokyo (JP)

(72) Inventor: Daric J. Galden, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/976,089

(22) Filed: Dec. 10, 2024

(51) Int. Cl.
| | | |
|---|---|---|
| *F02B 63/04* | (2006.01) | |
| *F21L 4/02* | (2006.01) | |
| *F21L 4/08* | (2006.01) | |
| *F21V 3/00* | (2015.01) | |
| *H02J 7/00* | (2006.01) | |
| *F21Y 115/10* | (2016.01) | |

(52) U.S. Cl.
CPC ............ *F21L 4/085* (2013.01); *F02B 63/048* (2013.01); *F21L 4/02* (2013.01); *F21V 3/00* (2013.01); *H02J 7/0044* (2013.01); *H02J 7/0047* (2013.01); *F21Y 2115/10* (2016.08)

(58) Field of Classification Search
CPC ...... F02B 63/04; F02B 63/044; F02B 63/047; F02B 63/048; F02B 2063/045; F02B 2063/046; F21L 4/00; F21L 4/02; F21V 7/00; F21V 7/0008; F21V 33/008; F21V 33/0084; H02J 7/0044
See application file for complete search history.

(56) References Cited

U.S. PATENT DOCUMENTS

| | | | |
|---|---|---|---|
| 6,296,370 B1 | 10/2001 | Bamber et al. | |
| 6,914,340 B2 | 7/2005 | Becker et al. | |
| 8,154,137 B1 * | 4/2012 | Flegel | F02B 63/048 290/1 A |
| 10,294,858 B2 | 5/2019 | Lan et al. | |
| 11,939,909 B2 | 3/2024 | Shimozono | |
| 2005/0252459 A1 * | 11/2005 | Johnson | F02B 63/04 290/1 A |
| 2006/0120086 A1 | 6/2006 | Yuen | |
| 2007/0278995 A1 | 12/2007 | Batdorff et al. | |
| 2008/0205048 A1 * | 8/2008 | Andrews | A45C 5/00 362/373 |

(Continued)

FOREIGN PATENT DOCUMENTS

| | | |
|---|---|---|
| CN | 204268097 U | 4/2015 |
| CN | 217904034 U | 11/2022 |

*Primary Examiner* — Levi Gannon
(74) *Attorney, Agent, or Firm* — Morgan Lincoln; American Honda Motor Co., Inc.

(57) ABSTRACT

A portable power station is disclosed. The portable power station includes an illumination device including a device body, and a light source configured to emit a light through an optically transmissive portion of the device body. The portable power station further includes a housing including a middle portion between a bottom portion and a top portion. The portable power station further includes a device holder configured to be positioned on the top portion and support the device body in an operative position. The portable power station further includes a diffuser configured to be removably mounted to the device body in the operative position. The portable power station further includes a first receptacle disposed on the middle portion and configured to removably receive and secure the device body, such that the optically transmissive portion remains at least partially uncovered, and a second receptacle configured to removably receive and secure the diffuser.

20 Claims, 8 Drawing Sheets

(56) References Cited

U.S. PATENT DOCUMENTS

| | | |
|---|---|---|
| 2012/0281421 A1 | 11/2012 | Lin |
| 2020/0011491 A1* | 1/2020 | Cao ........................ H02J 7/0068 |
| 2020/0044478 A1* | 2/2020 | Tally ................... H01M 10/465 |
| 2022/0154917 A1* | 5/2022 | Ma ....................... F21V 33/0004 |
| 2023/0396094 A1 | 12/2023 | Fenton et al. |
| 2024/0167676 A1* | 5/2024 | Bourne ..................... F21L 4/02 |

* cited by examiner

PORTABLE POWER STATION

BACKGROUND

The disclosed subject matter relates generally to a portable power station. More particularly, the disclosed subject matter relates to a portable power station including an illumination device.

Portable power stations are commonly used, for example, to charge batteries of equipment and/or enable use of equipment without dedicated batteries. Portable power stations may be used to assist outdoor activities, such as camping, hiking, etc., or activities during a blackout. In some cases, users carrying out such activities may experience low-light conditions (e.g., during night or blackout). Carrying out activities in low-light conditions may be unsafe and can detrimentally affect the experience of the users.

SUMMARY

In accordance with one embodiment of the present disclosure, a portable power station is disclosed. The portable power station includes a main power source. The portable power station further includes an illumination device. The illumination device includes a device body including an optically transmissive portion. The illumination device further includes a light source disposed within the device body. The light source is configured to emit a light through the optically transmissive portion. The illumination device further includes a device power source separate from the main power source. The device power source is electrically connected to the light source and configured to supply power to the light source. The portable power station further includes a housing. The housing includes a bottom portion, a top portion opposite to the bottom portion, and a middle portion between the bottom portion and the top portion. The portable power station further includes a device holder configured to be positioned on the top portion and support the device body in an operative position. The portable power station further includes a diffuser configured to be removably mounted to the device body in the operative position. The diffuser includes a reflective surface that faces the optically transmissive portion upon removable mounting of the diffuser to the device body. The portable power station further includes a first receptacle disposed on the middle portion. The first receptacle is configured to removably receive and secure the device body, such that the optically transmissive portion remains at least partially uncovered. The portable power station further includes a second receptacle configured to removably receive and secure at least the diffuser.

In accordance with another embodiment of the present disclosure, a portable power station is disclosed. The portable power station includes a main power source. The portable power station further includes an illumination device. The illumination device includes a device body including an optically transmissive portion. The illumination device further includes a light source disposed within the device body. The light source is configured to emit a light through the optically transmissive portion. The illumination device further includes a device power source separate from the main power source. The device power source is electrically connected to the light source and configured to supply power to the light source. The portable power station further includes a housing. The housing includes a bottom portion, a top portion opposite to the bottom portion, and a middle portion between the bottom portion and the top portion. The portable power station further includes a device holder configured to be positioned on the top portion and support the device body in an operative position. The portable power station further includes a diffuser configured to be removably mounted to the device body in the operative position. The diffuser includes a reflective surface that faces the optically transmissive portion upon removable mounting of the diffuser to the device body. The portable power station further includes a first receptacle disposed on the middle portion. The first receptacle is configured to removably receive and secure the device body, such that the optically transmissive portion remains at least partially uncovered. The portable power station further includes a second receptacle configured to removably receive and secure at least the diffuser. The device holder and the diffuser are stackable in a stacked configuration. The second receptacle is configured to removably receive and secure the device holder and the diffuser in the stacked configuration.

In accordance with yet another embodiment of the present disclosure, a portable power station is disclosed. The portable power station includes a main power source. The portable power station further includes an illumination device. The illumination device includes a device body including an optically transmissive portion. The illumination device further includes a light source disposed within the device body. The light source is configured to emit a light through the optically transmissive portion. The illumination device further includes a device power source separate from the main power source. The device power source is electrically connected to the light source and configured to supply power to the light source. The portable power station further includes a housing. The housing includes a bottom portion, a top portion opposite to the bottom portion, and a middle portion between the bottom portion and the top portion. The portable power station further includes a device holder configured to be positioned on the top portion and support the device body in an operative position. The portable power station further includes a diffuser configured to be removably mounted to the device body in the operative position. The diffuser includes a reflective surface that faces the optically transmissive portion upon removable mounting of the diffuser to the device body. The portable power station further includes a first receptacle disposed on the middle portion. The first receptacle is configured to removably receive and secure the device body, such that the optically transmissive portion remains at least partially uncovered. The portable power station further includes a second receptacle configured to removably receive and secure at least the diffuser. The top portion of the housing includes a top surface. In the operative position, the device body defines an angle relative to the top surface. The angle is from 70 degrees to 90 degrees.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-7B, wherein like numbers indicate the same or corresponding elements throughout the views.

As used herein, "a," "an," "the," "at least one," and "one or more" are used interchangeably. The term "configured to" is at least as restrictive as the term "adapted to" and requires actual design intention to perform the specified function rather than mere physical capability of performing such a function. Moreover, "at least one of A and B" should be understood to mean "only A, only B, or both A and B."

Figure 1:
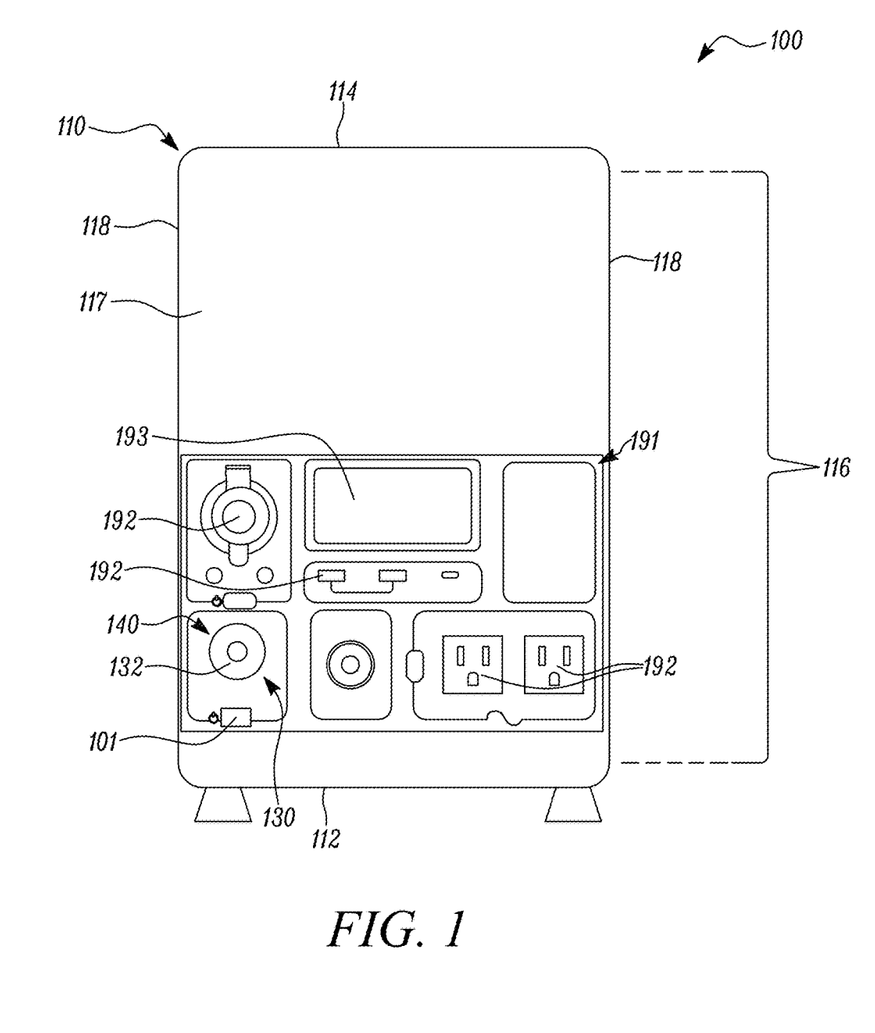
FIG. 1 is a front view of a portable power station in accordance with an embodiment of the present disclosure.
Figure 2:
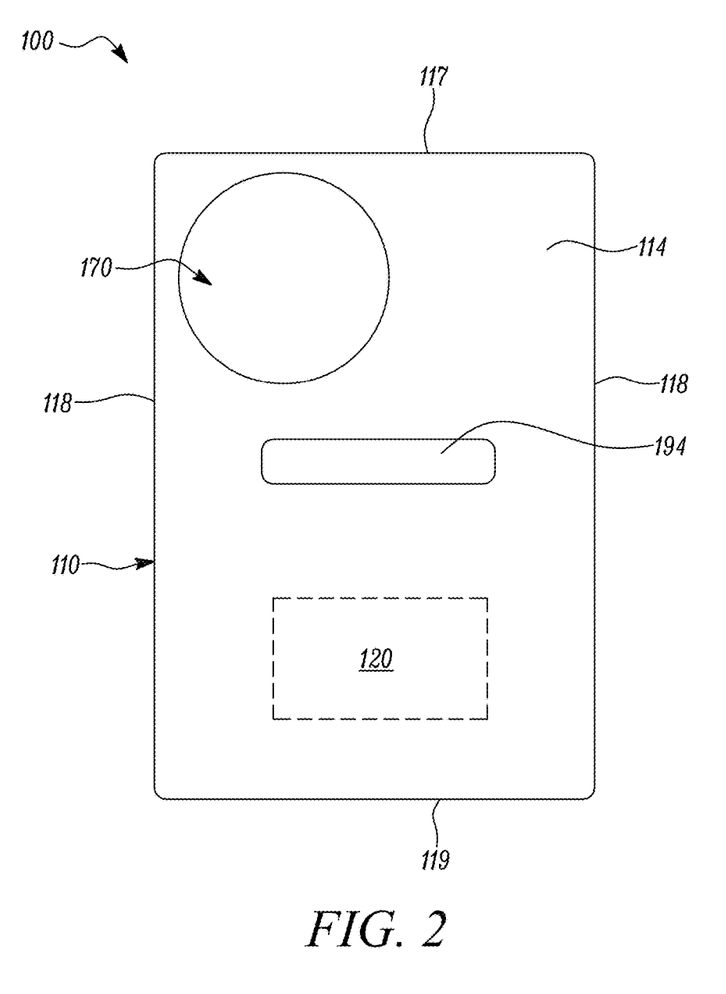
FIG. 2 is a top view of the portable power station in accordance with an embodiment of the present disclosure.

Referring now to the figures, FIGS. 1 and 2 illustrate a portable power station 100 in accordance with an embodiment of the present disclosure. Specifically, FIG. 1 illustrates a front view of the portable power station 100, and FIG. 2 illustrates a top view of the portable power station 100.

The portable power station 100 includes a housing 110. The housing 110 includes a bottom portion 112, a top portion 114 opposite to the bottom portion 112, and a middle portion 116 between the bottom portion 112 and the top portion 114. The bottom portion 112 may be configured to support the portable power station 100 on a surface (not shown).

The housing 110 may have any suitable shape and dimensions. In some embodiments, the housing 110 may have a cubical or a cuboidal shape. In such embodiments, the middle portion 116 may include a front portion 117, a pair of side portions 118, and a rear portion 119 opposite to the front portion 117. Further, the housing 110 may have any suitable construction. For example, the housing 110 may be constructed from a plurality of panels connected to each other.

The middle portion 116 may include an opening 191. The opening 191 may allow functional access to various components of the portable power station 100, which will be discussed in greater detail below. In the illustrated embodiment of FIG. 1, the front portion 117 includes the opening 191.

The portable power station 100 further includes a main power source 120 (schematically shown in FIG. 2). The main power source 120 may be at least partially enclosed by the housing 110. The main power source 120 may be configured to supply electrical power to one or more components of the portable power station 100. The main power source 120 may be of any suitable type.

In some embodiments, the main power source 120 includes an electric battery. The electric battery may include one or more electrochemical cells. The one or more electrochemical cells may be of any suitable type, for example, lithium-based electrochemical cells. In some embodiments, the main power source 120 includes a fuel generator. The fuel generator may include an alternator and an internal combustion engine that drives the alternator to produce electrical power. The internal combustion engine may use any type of combustible fuel, including, but not limited to gasoline or petrol, diesel, ethanol, methanol, natural gas, or any combination thereof. In some embodiments, the main power source 120 includes at least one of the electric battery and the fuel generator. In some embodiments, the main power source 120 may include both the electric battery and the fuel generator.

The portable power station 100 may include various components typically associated with a power station. Specifically, the portable power station 100 may include at least one electrical outlet 192 electrically connected to the main power source 120. The main power source 120 may be configured to provide power to an electrically operated device that is connected to the at least one electrical outlet 192. The portable power station 100 may be configured to provide alternating current (AC) output and direct current (DC) output via the at least one electrical outlet 192.

The at least one electrical outlet 192 may be of various different types. For example, the at least one electrical outlet 192 may be a three-prong outlet, a two-prong outlet, a Universal Serial Bus (USB) outlet, and so forth. The at least one electrical outlet 192 may be located at the opening 191. The portable power station 100 may further include a display device 193. The display device 193 may be configured to display an information associated with the main power source 120. In some examples, the display device 193 may be configured to display a state of charge (SoC) of the main power source 120. The display device 193 may be configured to display any information associated with the portable power station 100. The display device 193 may be located at the opening 191. The portable power station 100 may further include a global switch, inverters, fuses, safety circuits, transformers, and other such electrical components.

Figure 3:
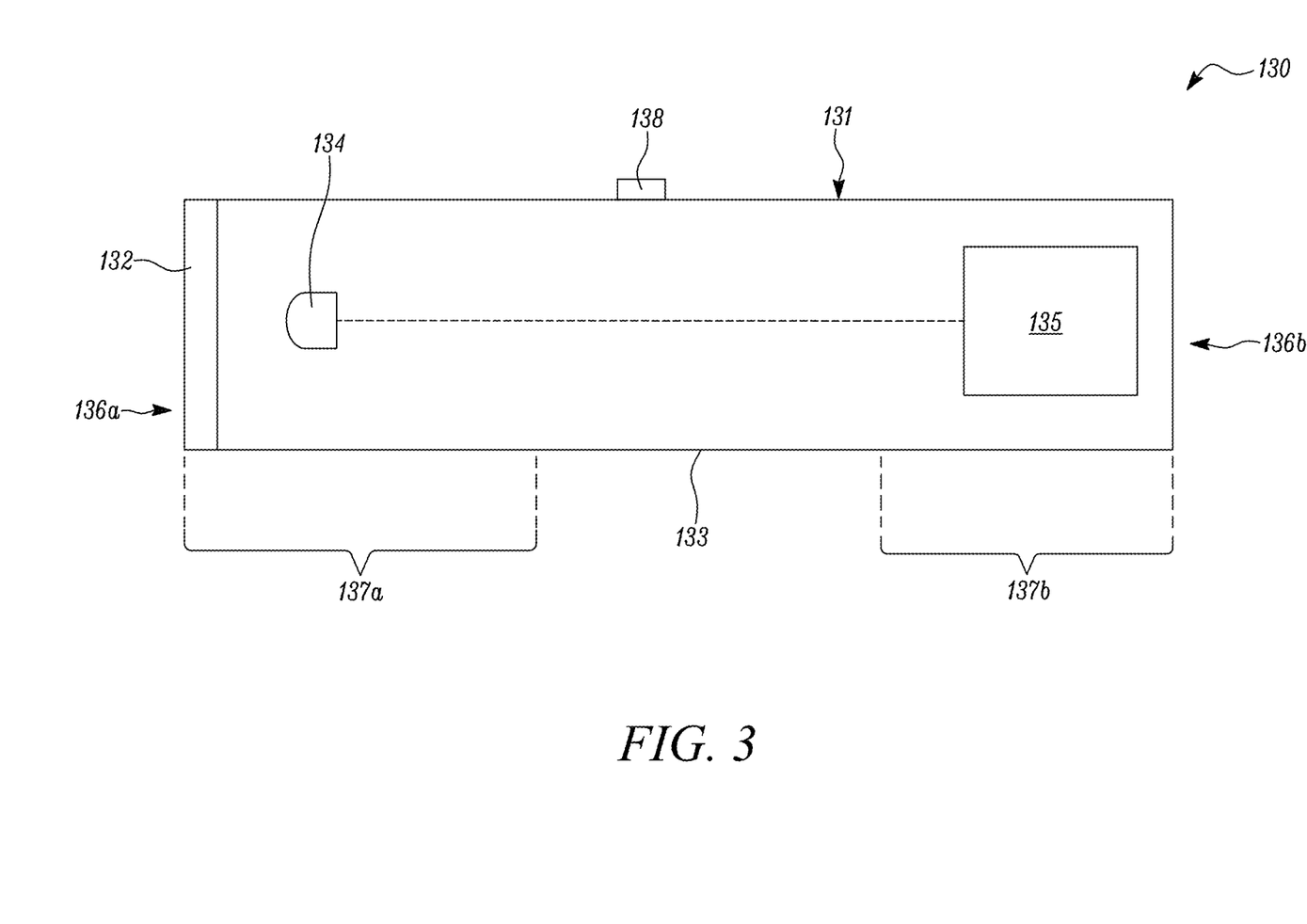
FIG. 3 is a schematic diagram of an illumination device of the portable power station in accordance with an embodiment of the present disclosure.

The portable power station 100 further includes an illumination device 130. The illumination device 130 is shown in isolation in FIG. 3. Referring to FIGS. 1 to 3, the illumination device 130 includes a device body 131. The device body 131 includes an optically transmissive portion 132. The optically transmissive portion 132 of the device body 131 may be formed by a transparent or translucent member, such as a lens.

The illumination device 130 further includes a light source 134 disposed within the device body 131. The light source 134 is configured to emit a light through the optically transmissive portion 132. The light source 134 may be of any suitable type, such as incandescent, halogen, xenon, metal-halide, and so forth. In some embodiments, the light source 134 may include a light emitting diode (LED).

The illumination device 130 further includes a device power source 135 separate from the main power source 120. The device power source 135 is electrically connected to the light source 134 and configured to supply power to the light source 134. The device power source 135 may include any suitable power source, such as an electric battery. In some embodiments, the device power source 135 may be rechargeable. The device power source 135 may include a secondary battery, for example.

The device body 131 may further include a casing portion 133 connected to the optically transmissive portion 132. The casing portion 133 may surround the device power source 135. The casing portion 133 may be formed by a rigid material and have a rigid construction. Further, the casing portion 133 may be configured to be gripped by a user.

The device body 131 may further include a first end 136a and a second end 136b opposite to the first end 136a. The optically transmissive portion 132 may be disposed proximal to the first end 136a. The device body 131 may further include a first end portion 137a extending partially from the first end 136a toward the second end 136b. The device body 131 may further include a second end portion 137b extending partially from the second end 136b toward the first end 136a. The second end portion 137b may be spaced apart from the first end portion 137a. In other words, the first end portion 137a and the second end portion 137b may be non-overlapping. The first end portion 137a may include the optically transmissive portion 132 and partially include the casing portion 133. The second end portion 137b may partially include the casing portion 133 and may be devoid of the optically transmissive portion 132.

The illumination device 130 may further include an on-device switch 138 configured to switch on and off supply of power from the device power source 135 to the light source 134. The on-device switch 138 may be positioned, for example, on the casing portion 133 of the device body 131.

The portable power station 100 further includes a first receptacle 140 disposed on the middle portion 116. As shown in FIG. 1, the first receptacle 140 may be disposed at the opening 191 of the middle portion 116. The first receptacle 140 is configured to removably receive and secure the device body 131, such that the optically transmissive portion 132 remains at least partially uncovered. In other words, the illumination device 130 may be removably secured to the first receptacle 140, such that the optically transmissive portion 132 remains at least partially uncovered by the portable power station 100. The first receptacle 140 may employ any suitable removable securement means, such as snap-fit members, hook and loop members, and/or other types of interference fit or frictional engagement members to removably secure the device body 131.

Therefore, the illumination device 130 may be used to illuminate a desired area of interest when the illumination device 130 is removably secured to the first receptacle 140. For example, the portable power station 100 may be positioned such that the illumination device 130, when removably received and secured by the first receptacle 140, illuminates the desired area of interest. Moreover, the illumination device 130 may be used to illuminate a walking path when the portable power station 100 is being carried. The portable power station 100 may further include a handle 194 connected to the top portion 114 of the housing 110. The handle 194 may facilitate carrying the portable power station 100.

The portable power station 100 may further include a station device switch 101 configured to switch on and off supply of power from the device power source 135 to the light source 134 when the device body 131 is removably received and secured by the first receptacle 140. The station device switch 101 may allow operating (i.e., switching on and off) the illumination device 130 without needing to remove the illumination device 130 from the first receptacle 140.

Furthermore, the illumination device 130 may be operated as an independent device when removed from the first receptacle 140. Specifically, the device power source 135 may allow the illumination device 130 to be operated as an independent device. The illumination device 130 may be conveniently removed from the first receptacle 140 and operated as a traditional flashlight to illuminate specific areas of interest. As discussed above, the illumination device 130 may include the on-device switch 138. The on-device switch 138 may be configured to switch on and off supply of power from the device power source 135 to the light source 134 when the device body 131 is removed from the first receptacle 140. The on-device switch 138 may be used to operate (i.e., switch on and off) the illumination device 130 when the illumination device 130 is removed from the first receptacle 140.

Figure 4:
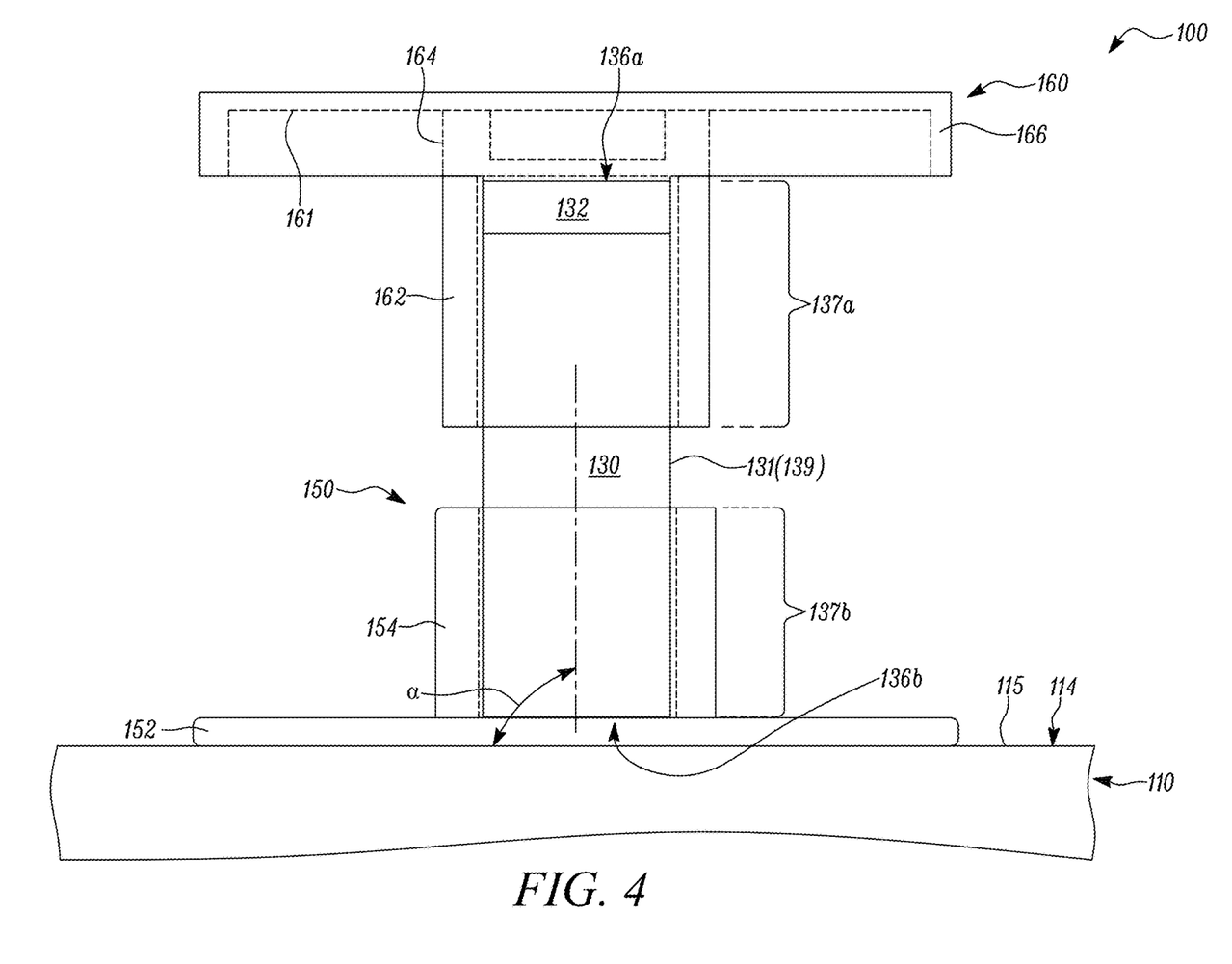
FIG. 4 is a schematic diagram of a portion of the portable power station in accordance with an embodiment of the present disclosure.

FIG. 4 illustrates a schematic diagram of a portion of the portable power station 100 in accordance with an embodiment of the present disclosure. The portable power station 100 further includes a device holder 150 and a diffuser 160. The device holder 150 is configured to be positioned on the top portion 114. The device holder 150 is further configured to support the device body 131 in an operative position 139. The device holder 150 may be configured to at least partially receive the second end portion 137b. Specifically, the device holder 150 may at least partially receive the second end portion 137b of the device body 131 to support the device body 131 in the operative position 139. Further, the diffuser 160 is configured to be removably mounted to the device body 131 in the operative position 139. The diffuser 160 may be configured to at least partially receive the first end portion 137a. Specifically, the diffuser 160 may at least partially receive the first end portion 137a of the device body 131 to removably mount to the device body 131. The diffuser 160 includes a reflective surface 161 that faces the optically transmissive portion 132 upon removable mounting of the diffuser 160 to the device body 131. The reflective surface 161 may be configured to diffuse the light emitted through the optically transmissive portion 132. The reflective surface 161 may be formed by a reflective member or a layer of reflective material (e.g., a metal or a metal alloy).

The operative position 139 may be any position of the illumination device 130, or more specifically, the device body 131 relative to the top portion 114 of the housing 110 which allows the diffuser 160 to be mounted to the device body 131. In some examples, in the operative position 139, the diffuser 160 may diffuse the light emitted through the optically transmissive portion 132 over the top portion 114 and surrounding areas of the portable power station 100.

The top portion 114 of the housing 110 may include a top surface 115. In some examples, as shown in FIG. 4, the top surface 115 may be substantially planar. In the operative position 139, the device body 131 may define an angle α relative to the top surface 115. The angle α may be from 70 degrees to 90 degrees. In the illustrated embodiment of FIG. 4, the angle α is about 90 degrees.

As discussed above, in the operative position 139, the diffuser 160 may diffuse the light emitted through the optically transmissive portion 132 over the top portion 114 and the surrounding areas of the portable power station 100. Further, the device holder 150 may support the device body 131 in the operative position 139, thereby allowing hands-free illumination. The device holder 150 and the diffuser 160 may therefore enable use of the illumination device 130 as a surface lamp. Therefore, the top portion 114 of the housing 110 may be conveniently used as a tabletop that is illuminated by the surface lamp.

Figure 5A:
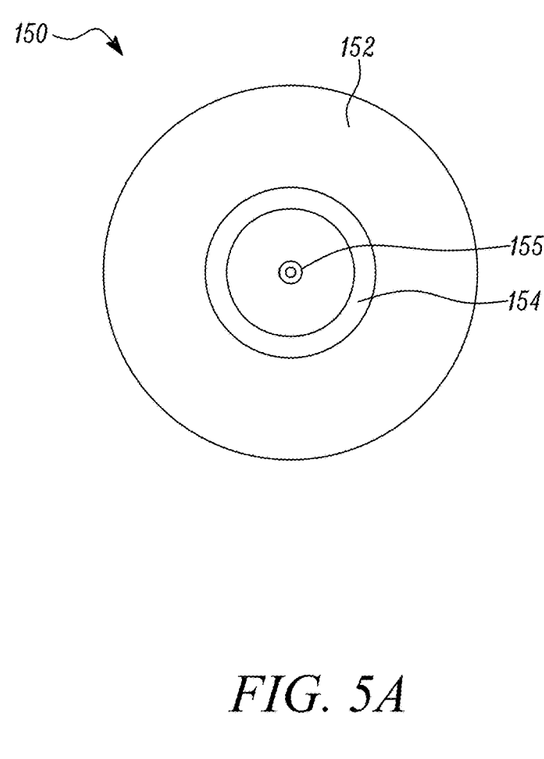
FIG. 5A is a top view of a device holder of the portable power station in accordance with an embodiment of the present disclosure.
Figure 5B:
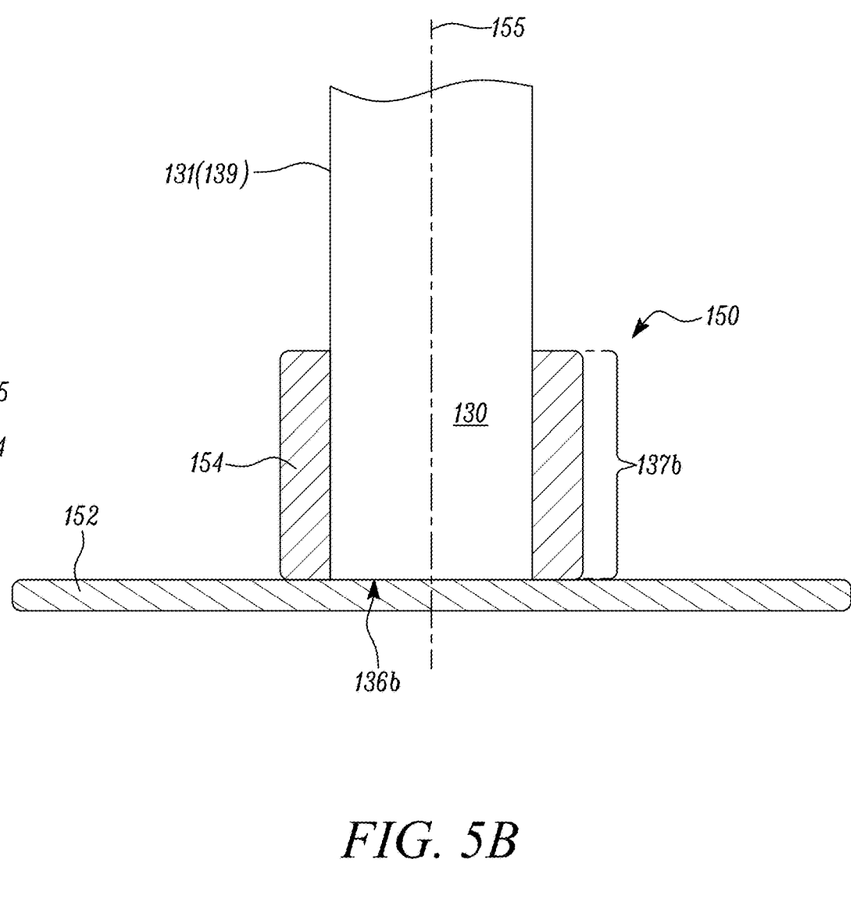
FIG. 5B is a sectional view of the device holder of FIG. 5A with the illumination device in accordance with an embodiment of the present disclosure.

The device holder 150 is also shown in FIGS. 5A and 5B. Specifically, FIG. 5A illustrates a top view of the device holder 150, and FIG. 5B illustrates a sectional view of the device holder 150 with the illumination device 130. Referring to FIGS. 4, 5A, and 5B, the device holder 150 may include a base 152. The base 152 may be configured to be positioned on the top portion 114. The device holder 150 may further include a support member 154 connected to the base 152. The support member 154 may be configured to at least partially receive and support the device body 131 in the operative position 139. The support member 154 may be configured to at least partially receive the second end portion 137b to support the device body 131 in the operative position 139. In some embodiments, the support member 154 may extend along and about a holder axis 155. The base 152 may extend radially outwardly relative to the holder axis 155. In some examples, the support member 154 may be cylindrical, and the base 152 may be disk shaped. While the device holder 150 is described and illustrated as being separate from the housing 110, it may be noted that the device holder 150 may be integral with the housing 110. In such embodiments, the device holder 150 may omit the base 152, and the support member 154 may extend directly from the top portion 114 of the housing 110.

Figure 6A:
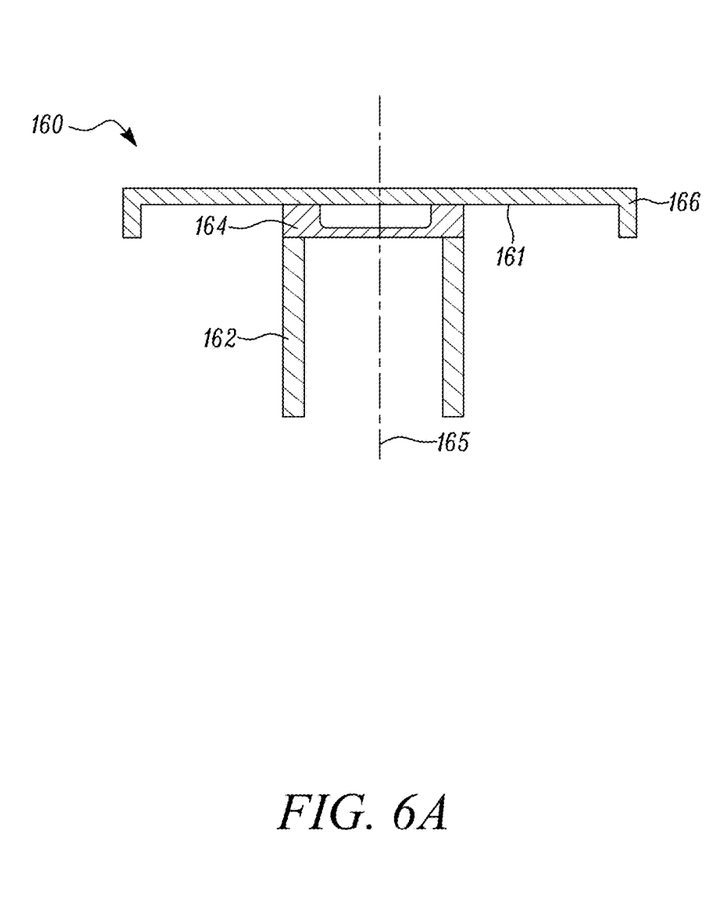
FIG. 6A is a sectional view of a diffuser of the portable power station in accordance with an embodiment of the present disclosure.
Figure 6B:
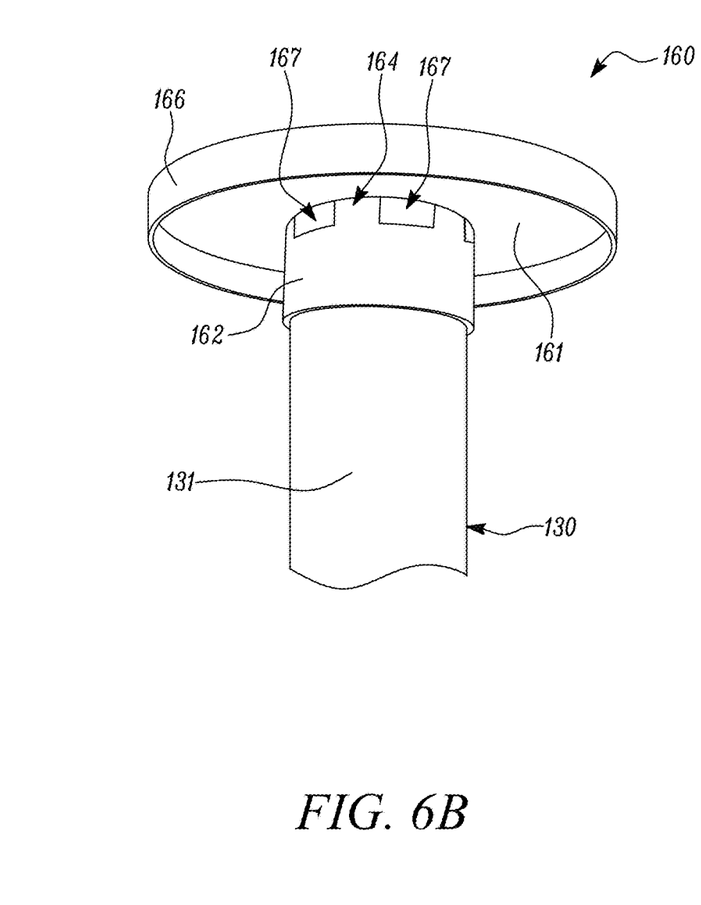
FIG. 6B is a perspective view of the diffuser of FIG. 6A with the illumination device in accordance with an embodiment of the present disclosure.

The diffuser 160 is also shown in FIGS. 6A and 6B. Specifically, FIG. 6A illustrates a sectional view of the diffuser 160, and FIG. 6B illustrates a perspective view of the diffuser 160 with the illumination device 130. Referring to FIGS. 4, 6A, and 6B, the diffuser 160 may include a mounting member 162 configured to at least partially receive the optically transmissive portion 132 of the device body 131. The diffuser 160 may further include an optically transmissive window 164 connected to the mounting member 162. The diffuser 160 may further include a diffusing member 166 connected to the optically transmissive window 164. The diffusing member 166 may include the reflective surface 161. The reflective surface 161 faces the optically transmissive window 164. The reflective surface 161 may be spaced apart from the mounting member 162. Specifically, the reflective surface 161 may be spaced apart from the mounting member 162 by the optically transmissive window 164.

The optically transmissive window 164 may allow transmission of the light emitted through the optically transmissive portion 132 of the device body 131 to the reflective surface 161, such that the reflective surface 161 reflects and diffuses the light. In some embodiments, the optically transmissive window 164 may include a plurality of optically transmissive portions 167 spaced apart from each other. The plurality of optically transmissive portions 167 may be formed by, for example, an optically transmissive material, or in some cases, by through apertures.

The mounting member 162 may extend along and about a diffuser axis 165. The diffusing member 166 may extend radially outwardly relative to the diffuser axis 165. In some examples, the mounting member 162 may be cylindrical, and the diffusing member 166 may be disk shaped.

Referring now to FIGS. 2 and 4, the portable power station 100 further includes a second receptacle 170 configured to removably receive and secure at least the diffuser 160. The second receptacle 170 may be used to securely store at least the diffuser 160, when not in use. The second receptacle 170 may be disposed at any suitable position on the housing 110. In some embodiments, the second receptacle 170 may be disposed on the top portion 114. The second receptacle 170 may employ any suitable removable securement means, such as snap-fit members, hook and loop members, and/or other types of interference fit or frictional engagement members to removably secure the diffuser 160, and optionally, other components of the portable power station 100.

The portable power station 100 may provide improved functionality of the illumination device 130. When secured by the first receptacle 140, the illumination device 130 may illuminate the walking path of an individual carrying the portable power station 100. Further, the illumination device 130 may be removed from the first receptacle 140, carried away from the portable power station 100, and used as a traditional flashlight. Moreover, the illumination device 130 may be used with the device holder 150 and the diffuser 160 as a surface lamp, thereby providing handsfree illumination of the top portion 114 of the housing 110 and the surrounding areas of the portable power station 100. The diffuser 160 may be conveniently removed from the second receptacle 170 when required, as well as securely stored in the second receptacle 170.

Furthermore, as discussed above, the device power source 135 may be rechargeable. In some embodiments, the main power source 120 may be configured to charge the device power source 135 when the device body 131 is removably received and secured by the first receptacle 140. The main power source 120 may be configured to charge the device power source 135 wirelessly (e.g., via inductive charging) or via a wired connection when the device body 131 is removably received and secured by the first receptacle 140. This may keep the device power source 135 sufficiently charged for operation of the illumination device 130 when the device body 131 is removably received and secured by the first receptacle 140. Further, this may increase the likelihood of the device power source 135 being sufficiently charged for prolonged operation of the illumination device 130 as an independent flashlight when the illumination device 130 is removed from the first receptacle 140.

In some embodiments, the main power source 120 may be configured to charge the device power source 135 when the device body 131 is supported by the device holder 150 in the operative position 139. The main power source 120 may be configured to charge the device power source 135 wirelessly (e.g., via inductive charging) or via a wired connection when the device body 131 is supported by the device holder 150 in the operative position 139. This may keep the device power source 135 sufficiently charged for operation of the illumination device 130 when the device body 131 is supported by the device holder 150 in the operative position 139. Further, this may increase the likelihood of the device power source 135 being sufficiently charged for prolonged operation of the illumination device 130 as the independent flashlight.

In some examples, the portable power station 100 and the illumination device 130 may be configured such that the main power source 120 bypasses the device power source 135 and directly powers the light source 134 (shown in FIG. 3) when the device body 131 is removably received and secured by the first receptacle 140 and/or when the device body 131 is supported by the device holder 150 in the operative position 139, for example, when the device power source 135 is charged above a predetermined threshold state of charge (SoC). This may prolong the operational life of the device power source 135.

Figure 7A:
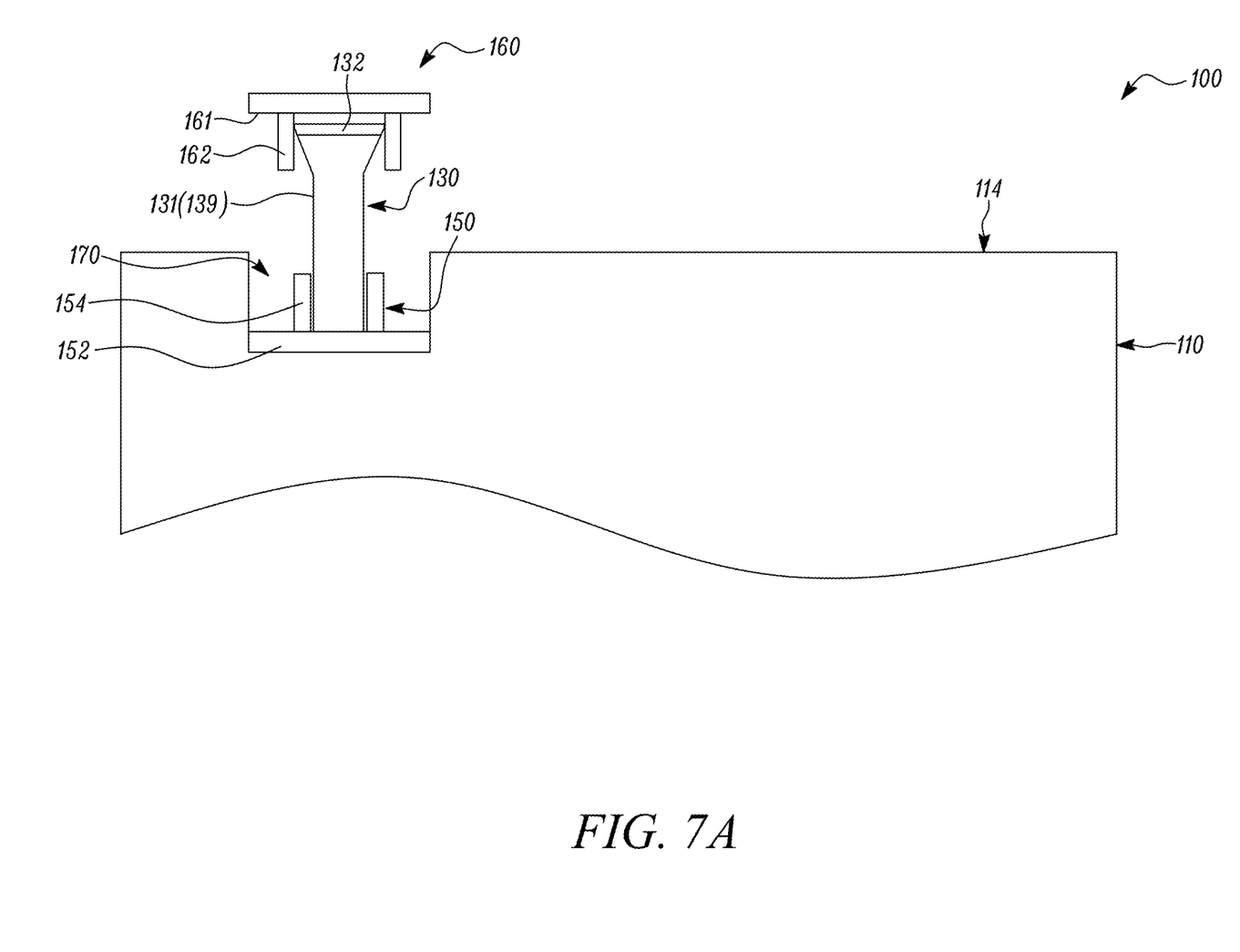
FIG. 7A is a schematic diagram of a portion of the portable power station in accordance with an embodiment of the present disclosure.
Figure 7B:
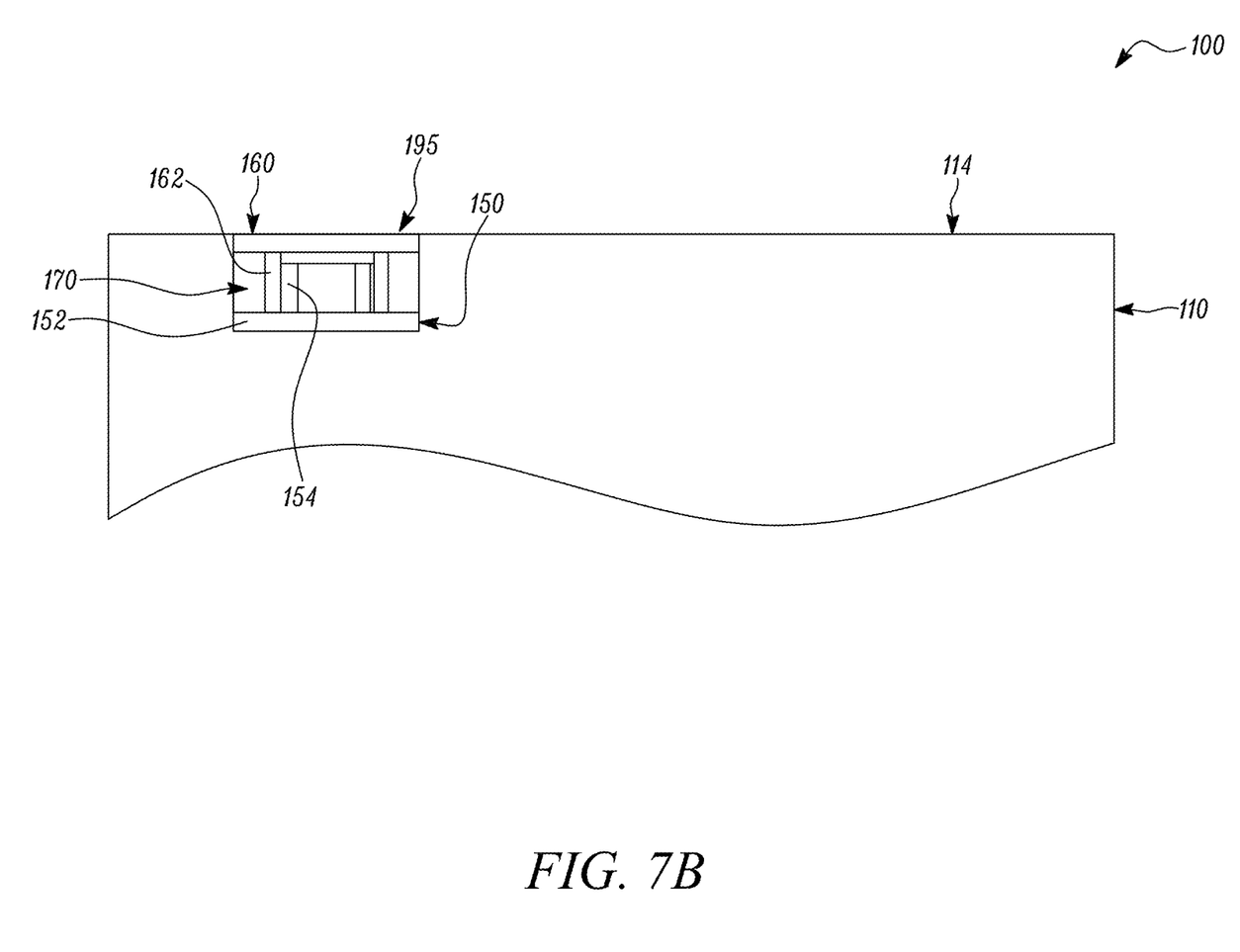
FIG. 7B is a schematic diagram of a portion of the portable power station showing the device holder and the diffuser in a stacked configuration in accordance with an embodiment of the present disclosure.

FIGS. 7A and 7B illustrate schematic diagrams of the portable power station 100 in accordance with an embodiment of the present disclosure. As discussed above, the second receptacle 170 may be disposed on the top portion 114. In such embodiments, where the second receptacle 170 is disposed on the top portion 114, the base 152 of the device holder 150 may be configured to be positioned in the second receptacle 170. Further, as shown in FIG. 7B, the device holder 150 and the diffuser 160 may be stackable in a stacked configuration 195. The second receptacle 170 may be configured to removably receive and secure the device holder 150 and the diffuser 160 in the stacked configuration 195. Therefore, both the device holder 150 and the diffuser 160 may be securely stored in the second receptacle 170 during transport, or when not in use. In some embodiments, the mounting member 162 of the diffuser 160 may at least partially receive the support member 154 of the device holder 150 in the stacked configuration 195. Further, in the stacked configuration 195, the support device and the diffuser 160 may be flush with the top portion 114 of the housing 110.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the disclosure be defined by the claims appended hereto.

What is claimed is:

1. A portable power station comprising:
   a main power source;
   an illumination device comprising:
      a device body comprising an optically transmissive portion;
      a light source disposed within the device body and configured to emit a light through the optically transmissive portion; and
      a device power source separate from the main power source, wherein the device power source is electrically connected to the light source and configured to supply power to the light source;
   a housing comprising:
      a bottom portion;
      a top portion opposite to the bottom portion; and
      a middle portion between the bottom portion and the top portion;
   a device holder configured to be positioned on the top portion and support the device body in an operative position;
   a diffuser configured to be removably mounted to the device body in the operative position, the diffuser comprising a reflective surface that faces the optically transmissive portion upon removable mounting of the diffuser to the device body;
   a first receptacle disposed on the middle portion, wherein the first receptacle is configured to removably receive and secure the device body, such that the optically transmissive portion remains at least partially uncovered; and
   a second receptacle configured to removably receive and secure at least the diffuser.

2. The portable power station of claim 1, further comprising a station device switch configured to switch on and off supply of power from the device power source to the light source when the device body is removably received and secured by the first receptacle, and wherein the illumination device further comprises an on-device switch configured to switch on and off supply of power from the device power source to the light source when the device body is removed from the first receptacle.

3. The portable power station of claim 1, wherein the device power source is rechargeable, and wherein the main power source is configured to charge the device power source when the device body is removably received and secured by the first receptacle.

4. The portable power station of claim 1, wherein the device power source is rechargeable, and wherein the main power source is configured to charge the device power source when the device body is supported by the device holder in the operative position.

5. The portable power station of claim 1, wherein the device body further comprises a first end and a second end opposite to the first end, and wherein the optically transmissive portion is disposed proximal to the first end.

6. The portable power station of claim 5, wherein the device body further comprises:
   a first end portion extending partially from the first end toward the second end, wherein the diffuser is configured to at least partially receive the first end portion; and
   a second end portion extending partially from the second end toward the first end, the second end portion being spaced apart from the first end portion, wherein the device holder is configured to at least partially receive the second end portion.

7. The portable power station of claim 1, wherein the device body further comprises a casing portion connected to the optically transmissive portion, and wherein the casing portion surrounds the device power source.

8. The portable power station of claim 1, wherein the device holder comprises a base configured to be positioned on the top portion.

9. The portable power station of claim 8, wherein the second receptacle is disposed on the top portion, wherein the base of the device holder is configured to be positioned in the second receptacle, wherein the top portion of the housing comprises a top surface, wherein, in the operative position, the device body defines an angle relative to the top surface, and wherein the angle is from 70 degrees to 90 degrees.

10. The portable power station of claim 1, wherein the device holder comprises:
   a base; and
   a support member connected to the base, wherein the support member is configured to at least partially receive and support the device body in the operative position.

11. The portable power station of claim 10, wherein the support member extends along and about a holder axis, and wherein the base extends radially outwardly relative to the holder axis.

12. The portable power station of claim 1, wherein the diffuser comprises:
   a mounting member configured to at least partially receive the optically transmissive portion of the device body;
   an optically transmissive window connected to the mounting member; and
   a diffusing member connected to the optically transmissive window, the diffusing member comprising the reflective surface, wherein the reflective surface faces the optically transmissive window, and wherein the reflective surface is spaced apart from the mounting member.

13. The portable power station of claim 12, wherein the mounting member extends along and about a diffuser axis, and wherein the diffusing member extends radially outwardly relative to the diffuser axis.

14. The portable power station of claim 1, further comprising a handle connected to the top portion of the housing.

15. The portable power station of claim 1, wherein the light source comprises a light emitting diode.

16. The portable power station of claim 1, wherein the main power source comprises at least one of an electric battery and a fuel generator.

17. The portable power station of claim 1, further comprising at least one electrical outlet electrically connected to the main power source, wherein the main power source is further configured to provide power to an electrically operated device that is connected to the at least one electrical outlet.

18. The portable power station of claim 1, further comprising a display device configured to display an information associated with the main power source.

19. A portable power station comprising:
a main power source;
an illumination device comprising:
    a device body comprising an optically transmissive portion;
    a light source disposed within the device body and configured to emit a light through the optically transmissive portion; and
    a device power source separate from the main power source, wherein the device power source is electrically connected to the light source and configured to supply power to the light source;
a housing comprising:
    a bottom portion;
    a top portion opposite to the bottom portion; and
    a middle portion between the bottom portion and the top portion;
a device holder configured to be positioned on the top portion and support the device body in an operative position;
a diffuser configured to be removably mounted to the device body in the operative position, the diffuser comprising a reflective surface that faces the optically transmissive portion upon removable mounting of the diffuser to the device body;
a first receptacle disposed on the middle portion, wherein the first receptacle is configured to removably receive and secure the device body, such that the optically transmissive portion remains at least partially uncovered; and
a second receptacle configured to removably receive and secure at least the diffuser;
wherein the device holder and the diffuser are stackable in a stacked configuration, and wherein the second receptacle is configured to removably receive and secure the device holder and the diffuser in the stacked configuration.

20. A portable power station comprising:
a main power source;
an illumination device comprising:
    a device body comprising an optically transmissive portion;
    a light source disposed within the device body and configured to emit a light through the optically transmissive portion; and
    a device power source separate from the main power source, wherein the device power source is electrically connected to the light source and configured to supply power to the light source;
a housing comprising:
    a bottom portion;
    a top portion opposite to the bottom portion; and
    a middle portion between the bottom portion and the top portion;
a device holder configured to be positioned on the top portion and support the device body in an operative position;
a diffuser configured to be removably mounted to the device body in the operative position, the diffuser comprising a reflective surface that faces the optically transmissive portion upon removable mounting of the diffuser to the device body;
a first receptacle disposed on the middle portion, wherein the first receptacle is configured to removably receive and secure the device body, such that the optically transmissive portion remains at least partially uncovered; and
a second receptacle configured to removably receive and secure at least the diffuser;
wherein the top portion of the housing comprises a top surface, wherein, in the operative position, the device body defines an angle relative to the top surface, and wherein the angle is from 70 degrees to 90 degrees.

* * * * *